United States Patent [19]
Pascasio et al.

[11] Patent Number: 5,716,026
[45] Date of Patent: Feb. 10, 1998

[54] HIGH-CAPACITY, HIGH-COMFORT SPLIT-LEVEL SEATING FOR TRANSPORT AND STATIONARY APPLICATIONS

[76] Inventors: Vidal Pascasio, 65-15 38 Ave., Apt. 2z, New York, N.Y. 11377; Roman Tuason, 1381 Brussels St., San Francisco, Calif. 94134

[21] Appl. No.: 514,933

[22] Filed: Aug. 14, 1995

[51] Int. Cl.[6] ........................... B61D 1/02; B64D 11/06
[52] U.S. Cl. ...................... 244/118.6; 105/315; 296/64
[58] Field of Search ........................... 244/118.6, 118.5, 244/122 R; 105/315, 316, 325, 326, 345; 5/9 R; 296/64

[56] References Cited

U.S. PATENT DOCUMENTS

| | | | |
|---|---|---|---|
| 1,991,536 | 2/1935 | Austin | 296/64 |
| 2,608,366 | 8/1952 | Jergeuson | 105/315 |
| 2,808,787 | 10/1957 | Murphy | 105/315 |
| 2,914,001 | 11/1959 | Murphy | 105/315 |
| 2,977,898 | 4/1961 | Candlin | 105/315 |
| 4,686,908 | 8/1987 | Legrand | 244/118.6 |

Primary Examiner—Galen L. Barefoot

[57] ABSTRACT

A split-level seating device for elevating and mounting alternate rows of seats for aircraft, surface transportation or for stationary applications, as a means to gain greater seating comfort and to increase overall seating capacity, by pre-empting otherwise unutilized or inefficient spatial displacement within such vehicles, to enable every sitter a lower seating position and every sitter to raise the legs at or above the level of the torso. A modular pedestal raises every other row of seats with their corresponding cross-aisle walkways at a sufficient height to provide legroom for floor level sitter, said module incorporating a legrest extension for upper level sitter, including the means for affixing state-of-the-art safety, sanitary and conveniency devices, such as safety crash-absorbing air bags and high-security kevlar lining, oxygen dispensers, purge vents and ultra-violet light outlets to cleanse the environment, moveable and adjustable footrests, eating-writing surfaces, and audio-visual entertainment and communications devices. The manner following convention of mounting arrays of massed seats at floor level is improved upon by elevating alternate rows of seats by means of said modular devices, all seats, both floor and split-level, being accessed from the same floor surface.

4 Claims, 7 Drawing Sheets

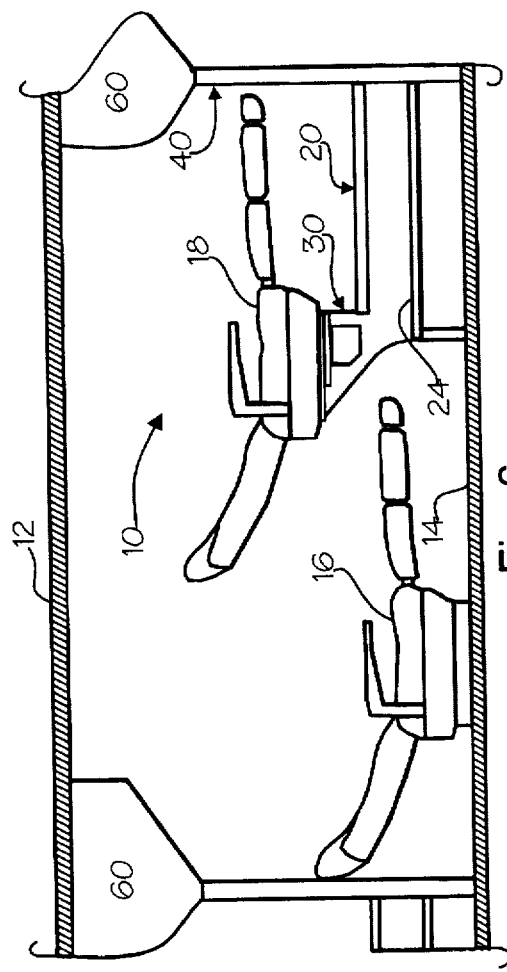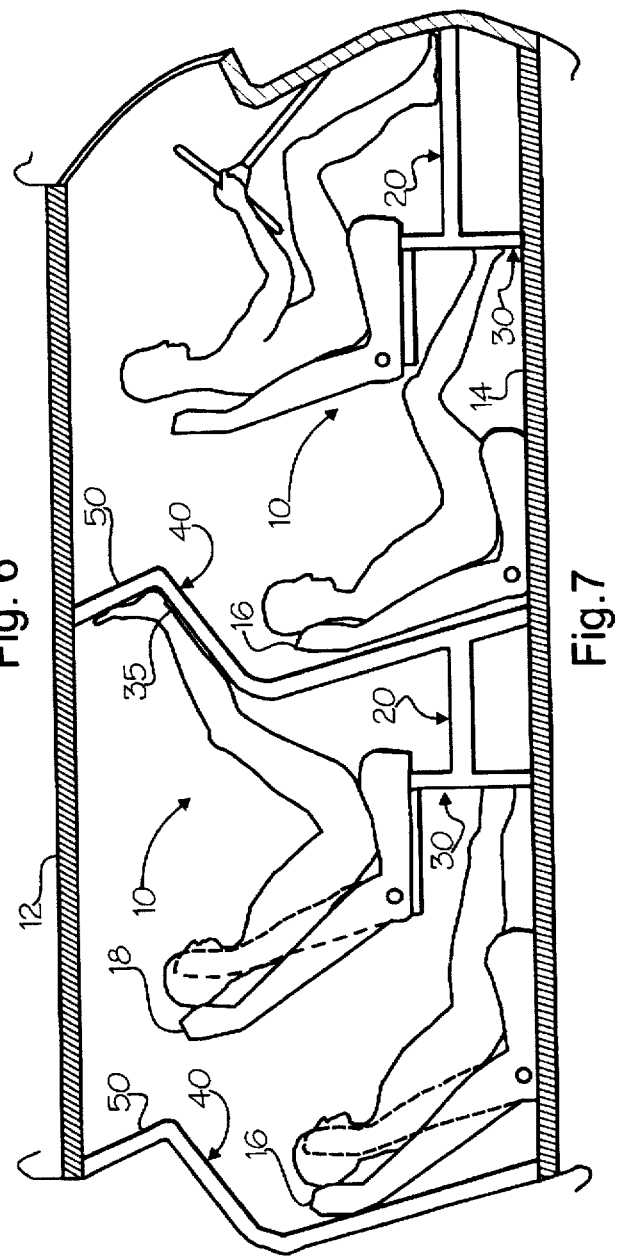

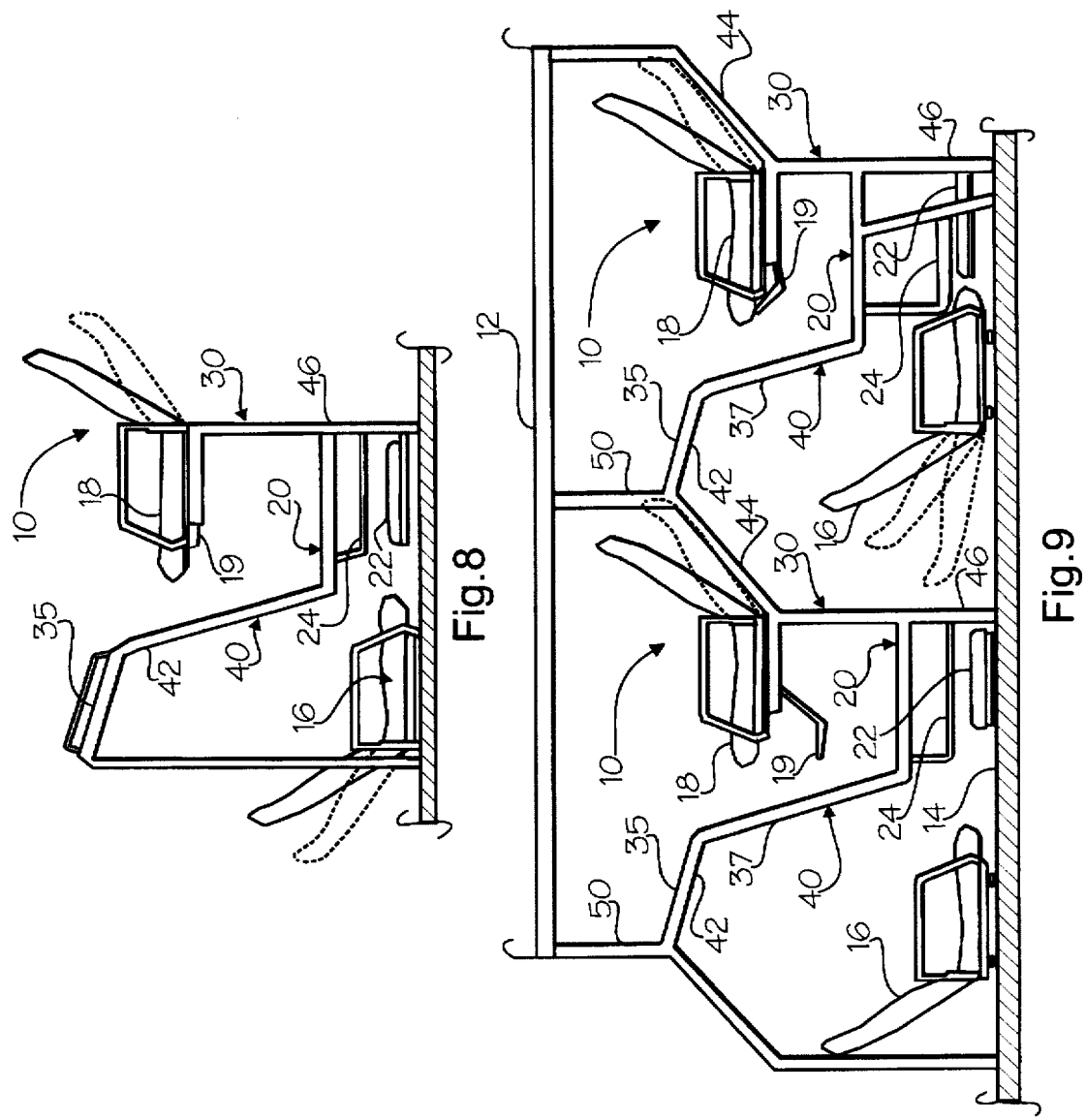

HIGH-CAPACITY, HIGH-COMFORT SPLIT-LEVEL SEATING FOR TRANSPORT AND STATIONARY APPLICATIONS

BACKGROUND OF THE INVENTION

References Cited

| U.S. patents | | | |
|---|---|---|---|
| 2,536,194 | 1/2/51 | R.G.F. Loewy | 105/316-29 |
| 2,600,706 | 6/17/52 | J.K. Tully | 105/316-29 |
| 2,808,787 | 10/8/57 | G.K. Murphy | 105/316-29 |
| 3,784,989 | 1/15/74 | Pierre LeGrand | 244/118 |
| 4,066,227 | 1/3/78 | Christian Buchael | 244/118 |
| 4,589,612 | 5/20/86 | Wibara Halim | 244/118 |

1. Field of the Invention

The present invention relates to split-level seating for providing more comfort and seating capacity for passengers, such as within surface transport and aircraft, and for stationary uses, such as resting or sleep-in stalls and furniture, by providing improvements in the art. More specifically, the present invention includes a modular pedestal for raising and mounting every other row of seats and their corresponding cross-aisle walkways sufficiently above floor level, to open up legroom underneath for the floor level sitters, and appropriating the void above the lower seats to provide legroom for the upper level sitters.

2. Description of Prior Art

The single-level seating arrangement, of a plurality of rows or of columns of seats of uniform width and seat surface height facing one direction on the same floor level, is the universal and familiar way of seating persons in public transport, being itself an institution the world over. But it has an irksome disadvantage, namely, the discomfort associated with sitting for extended periods with legs dangling and nowhere to extend them restfully into.

In this customary arrangement, the space between seats is as narrow and as constricted as fare and space-maximizing considerations will allow. This means that only enough space for exit and entry would be allotted, and the height of seats is likely to be not less than 15 inches, for the reason that a lower—and more comfortable—height would in effect reduce legroom, which tends to be opened vertically and not horizontally as required for greater comfort. The discomfort associated with the prior art of seating has been deemed the lot of everyone riding in public transport. Such discomfort is progressive as trips extend into hours and hours into days, and, despite advances in ergonomic seat designs and with legroom at a premium, is a given condition in transport economics. It sets in earlier among the elderly until, eventually, young and old alike are overtaken, such that bus passengers, who have to contend the most with more restricted seating and moving spaces, are regularly given breaks of a few minutes on extended trips to limber up. Among flyers in tourist class, it is advisable to leave seats every once in a while to be relieved of creeping discomfort, but mainly to prevent incidents associated with restricted blood flow, particularly due to the prolonged suspension of lower extremities of the body.

There has certainly been continuous progress in the ergonomics of seating, notably in cars, trains and in aircraft, and to a certain extent in bus travel, owing largely to modern surface and padding materials. The trend set by the automobile industry has spread to other transport sectors, although much remains to be improved. Features like reclining seats are almost universal, but lumbar supports, height adjustments and legrests still have to be economically justified by a combination of other cost-reducing or income-generating considerations. But even with quantum improvements in such amenities, no real gains in comfort are possible without a lot of legroom.

The "most comfortable way to fly" in tourist class offers space to cross one's legs in, perhaps, but not much more. The issue of where to extend a person's legs, to raise them if need be, has literally come to rest on the back of the seat in front, beyond which all leg movement for the sitter behind stops. Conventionally, the parameters regarded as more or less rigid for bus seat spacing or pitch (distance between the seat behind to the seat in front) range from 25 to about 35 inches. This makes for barely enough legroom to enable entry and exit for co-sitters in the same row. Pitch in passenger aircraft is a spread of 30 inches (predominantly at 32 inches for 'tourist' class) up to a bed length in luxury class, where legroom is purchased at a premium. Even in the new Boeing 777, "Don't look for much more legroom. You will get about the same as you get in most wide-body jets," cautions USA Today (Apr. 11, 1994).

In certain sections of the European rail network daytime seats convert to tiered bunk beds up to six in a compartment for night occupancy, a system called "couchettes." Split-level seating would take even less floor area per person in one such compartment, for seating passengers in round-the-clock comfort.

Prior art seating for people in waiting areas are neither efficient nor restful either, if legs raised and laid across empty seats by air travelers waiting for an overnight connection, by people keeping vigil in hospital lounges, and bus passengers in depots, are any measure.

Prior art seating in aircraft precludes the use of state-of-the-art safety airbags which require rigid anchorage points like dashboards on cars. The modular framework of the present invention not only serves to anchor but may actually require this safety device.

Accordingly, in view of the limitations in the prior art, if a means were disclosed whereby each sitter in such conveyances could enjoy virtually unhampered leg movement with no sacrifice in pitch, a certain measure of progress may have been attained. While the present invention is aimed at indeed attaining such comfort level, it bids to be space-saving (hence energy-saving) as well, demonstrating that savings in space of 10 percent or more are possible; the more legroom is allocated following prior art, the greater the space savings.

3. SUMMARY OF THE INVENTION

With these disadvantages in mind the present invention has been developed and accordingly it is a primary object of split-level seating to provide a device for mounting a plurality of arrayed, alternately elevated rows of seats and their corresponding walkways in aircraft, surface transport and in stationary applications, like home furniture and rest or sleep-in stalls, to achieve the greatest comfort of everyone at all times and to increase seating capacity. The method employed in the present invention would allow the use of split-level seating to substitute for bunk beds in homes and, as furniture, would save some thirty inches from standard bed length, with even less space needed for storage when seatbacks are upright. The Japanese catnap or snatch precious sleep in inexpensive and very accessible contraptions, crawl-into sleep-in compartments set atop each other, a means which likely has no local appeal. Split-level seating presents a proper alternative.

The present invention aims to provide increased legroom for every sitter, for those sitting on the lower or floor level and for those on every other row of upper or, herein synonymously and interchangeably alluded to as, split-level seats, by opening up legroom for lower level sitters within the alcove formed by vacating space occupied by the seats in front, which, together with their cross-aisle walkways, are raised sufficiently for that purpose, and, for upper level sitters, by employing the void above the next lower seats for the contrivance of cantilevered or suspended legrests for said sitters. By itself, seating everyone closer to the floor or walkway, thus raising the knee level above the waist, is already a gain in comfort. Enabling a greater seat recline angle for all seats by more forward slidability and providing legrests or ottomans, will further enhance comfort.

Said structurally unified and torsionally rigid module serves, in addition, to affix safety, sanitary and conveniency devices, consisting of, but not limited to, an impact-deploying safety airbag fore and a pre-deployed similar device aft for every passenger (thus technically satisfying the '35" head strike clearance' requirement of the FAA), air vents to purge certain areas of odor and noxious fumes in an emergency and ultraviolet light sources to periodically sanitize critical spots, and to attach other conveniency devices, such as folding writing-eating trays, reading lights, audio-visual and communications and oxygen dispensing devices, including customary luggage compartments and privacy baffles or curtains.

In its preferred embodiment, which may or may not be structurally suspended from the overhead structure, this module lends to easy, motorized and computerized adjustment of pitch, either as suspended from said overhead structure or riding on rails along the floor structure, or simultaneously, to respond to late moment changes in seating configuration.

Other embodiments of split-level seating, employing the same device for raising every other row of seats to open up legroom for the sitters underneath and utilizing the void above the lower seats to open space for upper or split-level legrests, are depicted in the drawings.

In essence, jogging seats along the longitudinal floor plane accounts for the space-saving feature of the present invention, effecting sets of tandem seats, one atop the other, coacting to compress their conjoint pitch. Accordingly, seating capacity may be coaxed to virtually double as the upper seat is rotated upward and to the rear, albeit at the price of a higher seat for the split-level and a smaller leg stretching space for either level. Rather, a compromise is disclosed by the preferred embodiment suggesting a quantum leap in comfort combined with a modest saving in space.

Thus, in a tandem of such seats in the present invention with a conjoint pitch setting of 60 inches (30 inches per sitter) enough space on either level would be opened to enable an average person to recline at 45 degrees and still raise the legs on a co-planar, or higher, attitude with the torso. A seven-footer in the lower seat would be seated upright, still be able to stretch his legs fully into the alcove thus formed, as would a person his size on the split level, and be far more comfortably seated than business class. At this pitch, standard buses with 47 passengers would seat 51.

The preferred embodiment for split-level seating, the best algorithm, is a combination of the lowest walkway elevation and the lowest mounting of the split-level seat, which, given the conventional headroom of 75 inches or so within public transport, would enable a seven-footer to access the split-level with a minimal stoop. Other embodiments feature higher walkways and seat mounts, as split-level seats are rotated to further compress space, but such would impinge on the available headroom. In all of its embodiments, all improvements signified by split-level seating as disclosed in the present invention are integrated with the split-level seating module, the lower level seat, save for the provision of a lower seat mount and casters when required, being entirely passive.

4. BRIEF DESCRIPTION OF THE DRAWINGS

FIG. 1 is a general side perspective view of preferred embodiment in a typical vehicular application, showing rows of split-level seating modules of the present invention with upper or split-level seats lined transversely at three abreast, interspersed along the longitudinal plane by rows of floor level seats of identical size and number, all seats facing one direction, the modules touching or attached to the overhead structure.

FIG. 6 is a side plan view of split-level seating for premier class transport applications;

FIG. 7 is a side plan view of split-level seating for minimal headroom vehicular and open public waiting-room applications;

FIG. 8 is a side plan view of split-level seating for typical furniture applications;

FIG. 9 is a side plan view of split-level seating for typical enclosed sleep-in stall or enclosed public waiting-room applications.

Figure 1:
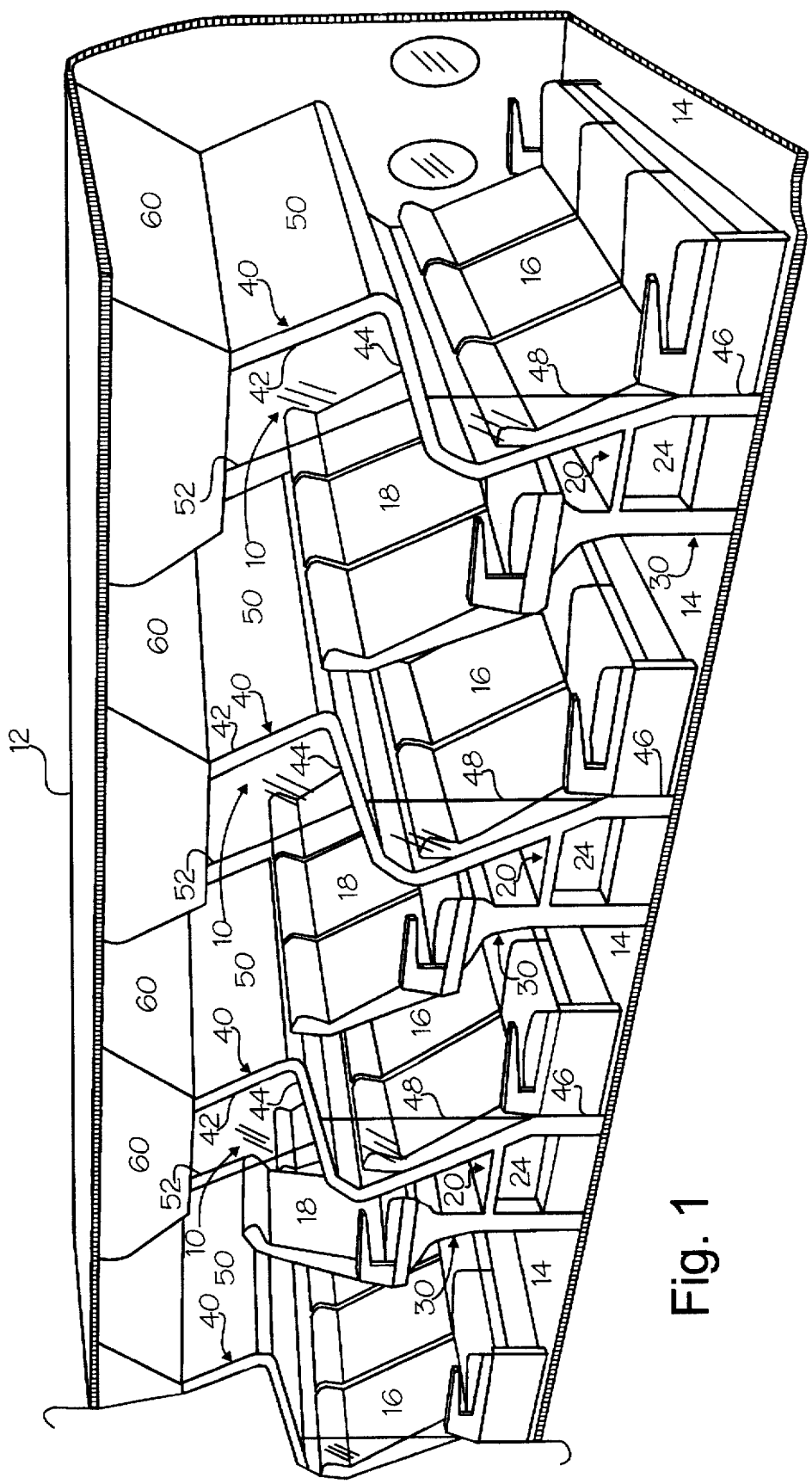

List of Reference Numerals Utilized in the Drawings

10—split-level seating module
12—overhead structure
14—floor structure
16—floor or lower level seat
18—split or upper level seat
19—ancillary fold-down footrest
20—elevated cross-aisle walkway
22—footrest or ottoman
24—step-up rung or foot well
26—upper level console panel
27—ultra-violet light source
28—air purge vent
29—lower level console panel
30—upper seat mount and pod
31—safety airbag lower level fore 32—safety airbag upper level fore
33—safety airbag upper level aft
34—safety airbag lower level aft
35—upper level legrest
36—upper level folding tray-legrest unit
37—padded partitioning panel
38—lower level folding tray
39—pull-out ancillary footrest
40—main load-bearing frame
42—main frame overhead extension member
44—main frame intermediate member
46—main frame floor extension member
48—lower level seat blind
50—upper legrest foot stopper panel
52—upper legrest baffle
54—floor track casters
56—overhead track
57—overhead track casters
58—floor track
60—overhead luggage compartment
61—handhold

5. DETAILED DESCRIPTION OF THE PREFERRED EMBODIMENT

The present invention reconfigures conventional seating within former spaces in vehicles, disclosing and pre-empting unobvious spatial economies for public and private seating as a means to increase torso and leg moving spaces (hence comfort) and save space (hence energy). No radical change in vehicle dimensions, no added floor surface or headroom is at all necessary. In gaining access to the seats, all from the same floor surface, only half of the passengers need climb one hop up, with no need to contort or to grovel. Being modular in structure, state-of-the-art safety and other devices are conveniently secured.

Figure 2:
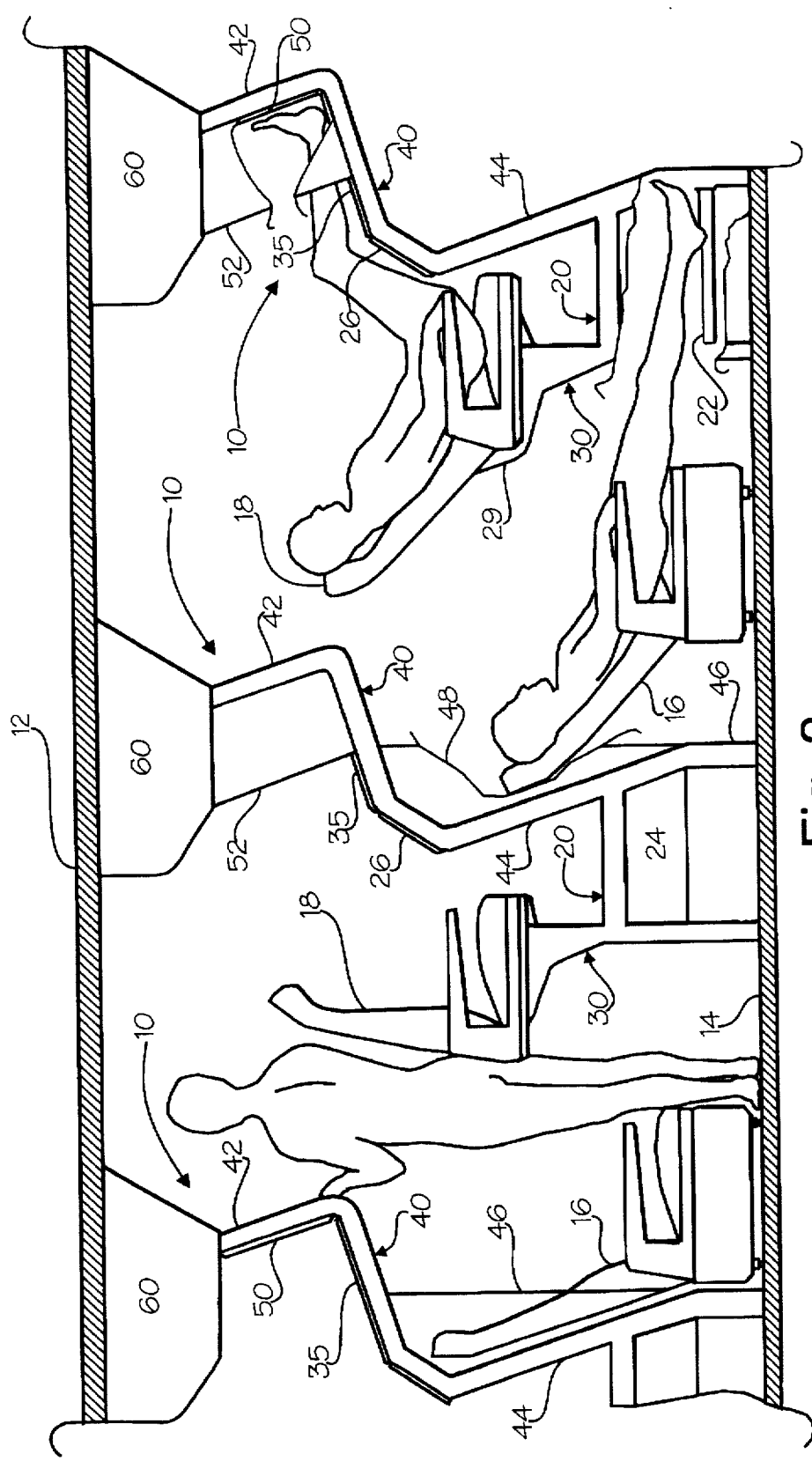
FIG. 2 is a side plan view of preferred embodiment of split-level seating of the present invention showing the allocation of useable space, the relative positions of floor and split-level seats, and the bodily disposition of average persons within.

Referring to FIGS. 1 and 2, a split-level seating module generally indicated as 10, is provided to be set upon a floor surface 14 in the interior compartment of a passenger aircraft, train, bus, van or boat, or in stationary applications such as in public waiting areas as plain seats or sleep-in stalls. In a vehicular application, as shown, seats are arrayed in the manner of conventional seating longitudinally along designated space facing one direction with cross-aisles for egress and ingress, said seat rows alternately interspersed by module 10 by means of which the level of every other row of seats 18 is raised, along with its corresponding cross-aisle walkway 20. The stock bucket upper seat 18, partly supported by mount and pod 30, is fully reclinable, slidably mounted on elongated rails, and may be optionally height adjustable for fine-tuning seating comfort. The split-level walkway 20 linking seat mount and pod 30 to main frame 40 is sufficient to clear a foot extended underneath; thus cross-aisle walkway 20 is assured to be low enough to permit a single-hop ascent from floor level. Still, a step-up foot well 24 further eases ascent and descent to the split-level. The alcove formed fore of the lower level seat 16 is disposed by the seat formerly fore presently elevated seat 18 and main frame floor extension 46, along with its own walkway 20, which is superposed over the feet and legs of the lower level sitter, said alcove freeing up legroom for floor level sitter by as deep as the combined throw of the superposed elevated seat and its walkway and as wide as the seat displaced. Within the seating and leg-stretching space thus created a standard reclining bucket seat 16 fitted with casters or slidably mounted on elongated tracks, likewise optionally fitted with height adjusters, would, by its longer traverse and its standard ottoman 22, enable the sitter a semi-recumbent legs-up sitting position, and, as pitch increases and with full seatback rotation, allow a fully-recumbent position. As part of the main frame 40 intermediate frame 44, on either side of module 10, cantilevers the upper or split-level sitter's own padded legrest 35, or simultaneously suspends the module 10 from the overhead structure through upper extension member 42, to which the transverse footguard panel 50, the forward end of the upper legrest alcove, is secured. Passengers on either level are able to cross aisles to their respective seats with relative ease particularly when seatbacks are upright (FIG. 2), and reach up for luggage compartments 60 which may be opened to more than one side. Assuming the standard headroom shown, a seven-foot high person needs a slight crouch to enter the vehicle and a little more to access the split-level. Flexible privacy curtains or blinds 48 or rigid baffles 52 serve to set off compartments or sections of seats.

Figure 3:
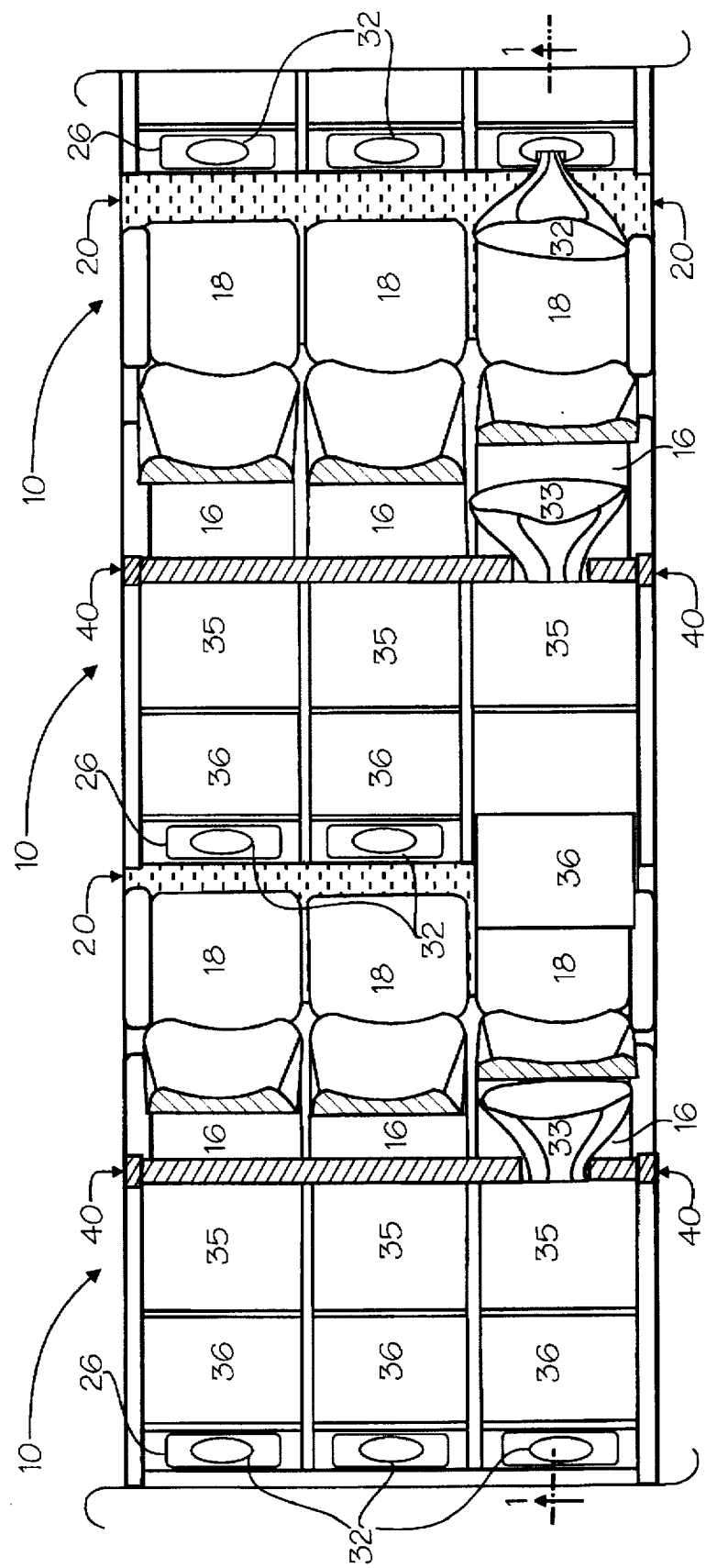
FIG. 3 is a sectional plan view of preferred embodiment of split-level seating taken on the line 2—2 in FIG. 4.

FIG. 3 is a sectional plan view of the preferred embodiment of split-level seating modules 10, each framed on either end by main load-bearing frame 40, showing a series of three-seat wide modules as wide as lower level seats 16, the only non-integral parts of module 10, and split-level seats 18 with their corresponding legrests 35, across elevated cross-aisle walkway 20, composed of noise and shock-dampening padding whose surface is broken along its midpoint by a similarly padded section 36, which is the underside of a folding tray-writing surface which drops over console panel 26, which in turn serves as anchorage points for upper seat safety air bag devices 32 fore of seats 18, one such device is shown deployed while two other upper safety airbags 33 aft of seats 18 are likewise shown deployed, said console 26 also serving to attach other devices such as audio-visual, communications and oxygen apparati.

Figure 4:
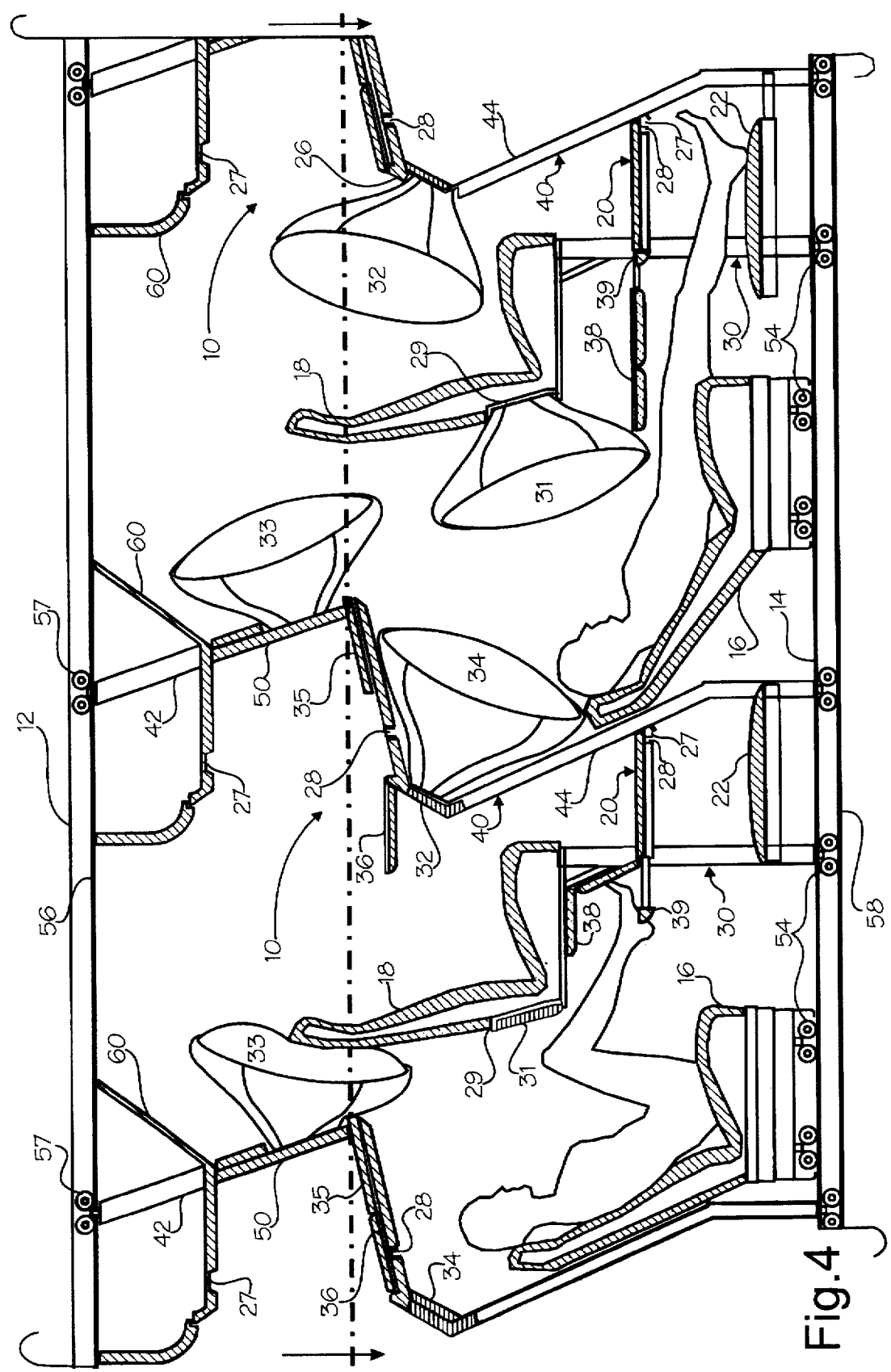
FIG. 4 is a longitudinal vertical section taken on the line 1—1 of FIG. 3 showing structure of split-level seating and all improvements signified by present invention.

Turning now to FIG. 4, sectional view is shown of module 10, incorporating all improvements disclosed in the present invention. Various devices may be attached to the split-level seating module 10, such as pull-out ancillary footrest 39, slidable legrest or ottoman 22, air purging vents 28, for normal or emergency evacuation of effluents or noxious fumes, ultra-violet light sources 27 for periodic sanitizing of certain critical areas, folding eating-writing tray 38 for lower and 36 for upper level sitter, in addition to aforementioned twin safety air bags per person, pre-deployed 33 and 34 and impact-deploying 31 and 32, in an emergency. Console panels 26 for upper and 29 for lower level sitters serve to secure such devices as audio-visual entertainment and oxygen dispensing devices, and aforesaid safety air bags. Ample soft, padded surfaces 37 lining both sides of transverse portions of main frame 40 serve to isolate sounds, absorb vibrations and cushion other hard surfaces. Space-age materials, including high-security kevlar lining, may be designed into the module. Owing to the unique design of split-level seating as disclosed in the present invention, all improvements are integrated to the module 10. The floor level seat 16 is entirely stock and passive and needs only a lower seat mount and casters 54 for easy slidability when needed. While upper seat 18 is similarly stock, modifications to dispose part of the console panel 29 may be needed. Module 10 may either be permanently affixed or moveably pitch adjustable along floor track 58 or suspended either solely or simultaneously by casters 54 along overhead track 56 from overhead structure 12, to respond to varying loads and seating configurations.

Figure 5:
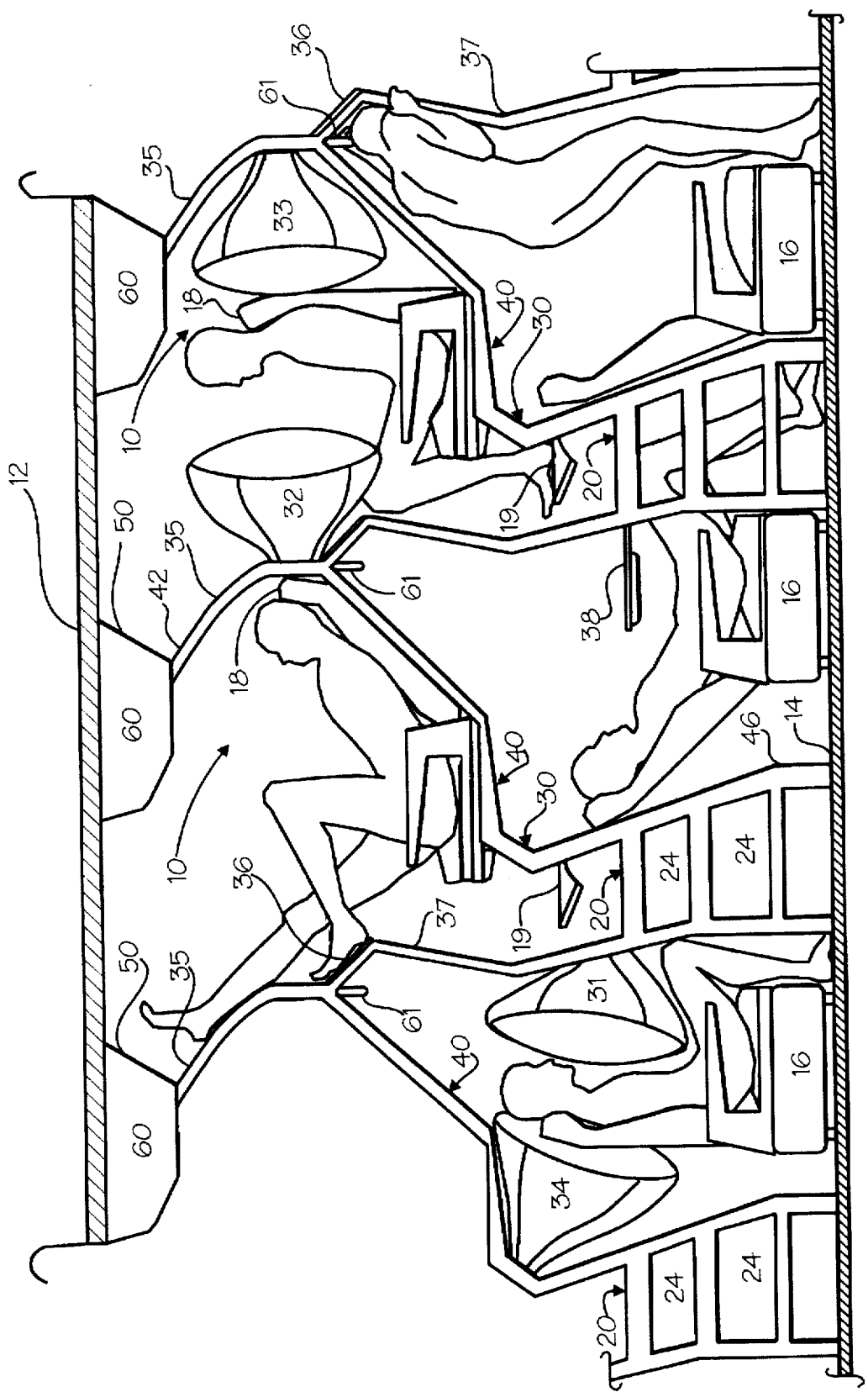
FIG. 5 is a side plan view of a very high capacity embodiment of split-level seating with each level of seats facing opposite directions.

FIG. 5 is an embodiment of split-level seating exemplifying a very high capacity passenger vehicle configuration at a conjoint pitch of a mere 50 inches or 25 inches per passenger. In this disclosure, the sitters face opposing directions. Within the split-level seating module 10, the upper or split-level walkway 20 is situated higher from the floor level 14 requiring an extra rung of step-up foot well 24; likewise, the level of upper seat 18 is higher and requires a footrest 19 to raise the feet, hence the knees, above waist level for comfort. The same method of split-level seating applies in that more legroom is provided for the floor level seat 16 by raising the frontally adjacent seat, legroom for the split-level seat 18 being created by disposing some of the headroom over the lower level seat and augmented by some above the reclined upper seat in front. Eating-writing tray 38 serves the lower level sitter and 36 the upper level, the latter serving as a footrest when in a stowed position, intersecting with a padded partition 37, which is sufficiently rigidly framed to anchor safety airbag 31 fore of lower seat 16, and to partly support elevated walkway 20, its load being transmitted to the floor structure 14. Similarly, two airbags per sitter may be provided, a pre-deployed aft and an impact-deploying fore. Overhead hand luggage compartment 60 may be feasible only if enough headroom is available, handholds 61 may be strategically located and air purging vents lend to a rider-friendly environment, while curtains for privacy may be provided, as may all other features of the preferred embodiment aforementioned of split-level seating.

FIG. 6 is a depiction of the split-level seating module 10 applied to stock premier class seating provided with integrally mounted folding legrests which in prior art spacing would be at least 60 inches of pitch per passenger, just enough to elevate the legs till the feet are estopped below waist level by the reclined seatback of the sitter fore; unlike the present invention, given a conjoint pitch of less per passenger by splitting seat levels, the legrest is free to rotate the limbs up past waist level and allow lower level sitter 16 to assume a fully-recumbent mode. At floor level 14 lower level seat 16, taking advantage of freed space and with seatback upright, may be slid back a full yard to open some six square feet of frontal space. Upper level seat 18 sits on mount and pod 30 forming a pedestal supported on either end by main frame 40, transversely linked by shin-high upper level walkway 20 and accessed directly from floor level or through step up rung 24, assuming an identical fully-recumbent posture but with a little less frontal space. Since the combined pitch of seats 16 and 18 if set upon the same plane would be some 120 inches, and the conjoint pitch of the split-level mode as depicted is some 105 inches, comfort gains immeasurably although space saved by the split-level mode would have been a modest 13 percent. It is apparent from the depiction, however, that more space savings could be generated just by reducing the conjoint pitch further. As in the preferred embodiment of split-level seating, appropriate safety and other devices may be affixed to the module.

FIG. 7 is a side plan view of a low-headroom vehicular or stationary public waiting-room open-seating application of split-level seating, showing module 10 wherein upper seat 18 is mounted on seat pod 30 closer to floor level 14, with a minimal foot clearance space within the floor level alcove underneath walkway 20, and upper legrest 35 pitches up more steeply over lower seat 16 fore. Features described are not limited to those indicated and may be extended to include such safety and conveniency devices employed by the preferred embodiment of split-level seating.

FIG. 8 is a typical home furnishing application of split-level seating module 10 disclosing a high-comfort and space-saving alternative to tiered bunk beds, employing the same method of opening up legroom for the lower level seat 16 by raising the other seat of a tandem with its own walkway 20, said upper level seat 18 being separated by a panel 37 from the floor level seat 16, and seats varying in width.

FIG. 9 represents a sleep-in stall or enclosed public waiting-room application of split-level seating module 10 which would normally be covered on all sides by appropriate noise and vibration-dampening flooring and sidings to serve as compartments with a controlled environment for rest or sleep in public or waiting-room areas in airports, hospitals, in bus depots and the like. As in the other embodiments, legroom is opened for floor level seat 16 occupant by a raised other half of a pair of tandem seats, split-level seat 18 with its own walkway 20, within a unit lending easily to isolation. Such units may be strung longitudinally and twin sets of such compartments of varying seat widths laid side-by-side, all units opening along either side. It is understood that all appropriate features of split-level seating and its preferred embodiment extend and apply to the aforementioned as well.

What is claimed:

1. A unitized split-level seating device for expedited installation, pitch adjustment and removal in transportation interiors and open spaces with a plurality of unidirectional seats with fully reclining or sleeping mode seatback arrangement, such as in aircraft, buses, trains and the like and comprising:

a torsionally rigid seat-elevating pedestal structure including the substantially integral combination of plural laterally spaced and longitudinally oriented beams, cross rails, corner posts and panels defining the lateral boundaries of said structure;

means extending between first laterally opposite pairs of longitudinal beams into a plurality of mutually exclusive, parallel and immediate laterally adjacent passenger or individual seating sections;

means of displaceably supporting each of said seats between said corner posts whereby each seat may be at least partially displaced vertically from the floor surface;

means of displaceably supporting cross-aisle walkway between said corner posts and beams whereby each seat is served by said walkway which is partially disposed at least at a lower level than the said seats but at least partially displaced vertically from said floor surface;

means for upwardly extending forward posts connecting to said walkway to mainframe intermediate member supporting a panel extending from said floor surface substantially vertically above said floor surface at least partially vertically above said walkway and at least partially vertically above bench level of said seat, said panel connecting to a sloping portion supporting a legrest extension, said sloping portion extending upwardly and forwardly and connecting to a vertical panel terminating at overhead structure of vehicle or compartment, said sloping portion at least vertically clearing upper seatback headrest portion of floor level seat;

means alternatively linking said walkway with main frame supporting a panel which is disposed at least substantially vertically from said floor surface and at least vertically above said walkway and extending to the overhead structure of vehicle or compartment.

2. A unitized split-level seating device for expedited installation, pitch adjustment and removal in transportation interiors and open spaces with fully reclining or sleeping mode seatback arrangement, such as in aircraft, buses and the like as in claim 1, further comprising:

ancillary means of displaceably attaching on top and bottom of said split-level device structure for anchoring or movably suspending along longitudinal rails said structure by rollers, or permit simultaneously rolling along longitudinal rails on said floor structure by casters.

3. A unitized split-level seating device for expedited installation, pitch adjustment and removal in transportation interiors and open spaces with a plurality of seats with fully reclining or sleeping mode seatback arrangement, such as in aircraft, buses, trains and the like and comprising:

a torsionally rigid seat-elevating pedestal structure including the substantially integral combination of plural laterally spaced and longitudinally oriented beams, cross rails, corner posts and panels defining the lateral boundaries of said structure;

means extending between first laterally opposite pairs of longitudinal beams into a plurality of mutually exclusive, parallel and immediately laterally adjacent passenger or individual seating sections;

means of displaceably supporting each of said seats between said corner posts whereby one post is connected to horizontal intermediate frame supporting said seat, where said seat may be at least partially displaced vertically from said floor surface, said seat at least vertically clearing the seatback headrest portion of floor level seat;

means of displaceably supporting cross-aisle walkway between said corner posts and beams whereby each seat is served by said walkway which is partially disposed at least at a lower level than the said seats but at least partially displaced vertically from said floor surface;

means of upwardly extending corner post connecting to said walkway and supporting a panel, said panel starting from the level of said walkway extending substantially vertically upward at least partially above seat bench level of said seat, connecting to legrest extension, said legrest extension sloping upwardly and forwardly and connecting to a substantially vertical panel terminating at overhead structure of vehicle or compartment.

4. A unitized split-level seating device for expedited installation, pitch adjustment and removal in transportation interiors and open spaces with a plurality of seats with fully reclining or sleeping mode seatback arrangement, such as in aircraft, buses, trains and the like as in claim 3, further comprising:

ancillary means of displaceably attaching safety airbags fore and aft for floor level seat, safety airbags fore and aft for split-level seat, writing-eating surfaces, footrest, ottoman, infrared lamp outlets air purging vents, luggage compartment, including but not limited to oxygen dispensing taps and audio-visual communications and entertainment devices.

* * * * *